United States Patent [19]

Haggas

[11] Patent Number: 4,676,753

[45] Date of Patent: Jun. 30, 1987

[54] IDENTIFICATION KITS

[75] Inventor: Robert H. Haggas, Bingley, England

[73] Assignee: Valley Printing Company Limited, Bingley, United Kingdom

[21] Appl. No.: 711,035

[22] Filed: Mar. 12, 1985

[30] Foreign Application Priority Data

Mar. 12, 1984 [GB] United Kingdom ................. 8406436

[51] Int. Cl.[4] ................................................ G09B 1/06

[52] U.S. Cl. .................................................... 434/155

[58] Field of Search ...................... 273/157 A; 355/79; 434/80, 88, 155, 408; 446/100

[56] References Cited

U.S. PATENT DOCUMENTS

| | | | |
|---|---|---|---|
| 3,553,864 | 1/1971 | Karlyn | 434/408 X |
| 3,896,565 | 7/1975 | Quinn | 434/155 |
| 4,226,030 | 10/1980 | Quinn | 434/155 |

FOREIGN PATENT DOCUMENTS

| | | | |
|---|---|---|---|
| 423200 | 1/1935 | United Kingdom | 446/100 |
| 1137088 | 12/1968 | United Kingdom | 434/155 |
| 2032671 | 5/1980 | United Kingdom | 273/239 |

*Primary Examiner*—William H. Grieb

*Attorney, Agent, or Firm*—Henry Sternberg; Bert Lewen

[57] ABSTRACT

An identification kit comprising at least one base sheet printed with the outline shape of a human face desirably in color to represent a particular skin tone and including within the print outline highlighted areas and shaded areas but otherwise being generally featureless. A plurality of overlay elements are provided each printed with a detail of a human face, again in color and of a similar skin tone and designed to be positioned on the base sheet.

23 Claims, 4 Drawing Figures

IDENTIFICATION KITS

This invention relates to identification kits. Various types of identification kits are known which require the assembly together of a plurality of pieces bearing representations of parts of the human face. The pieces are assembled edge to edge, one common arrangement being that each piece comprises a horizontal band of the face. In other systems the face is sub-divided into smaller sections, but all such arrangements suffer from various disadvantages, despite their wide use by law enforcement and other agencies. For example, pictures produced with the known sets have lines appearing across the constructed face, which can lead to recognition difficulties. Because of this it is common practice to draw an artist's impression of the constructed face and to use that impression as the basis for possible identification. It will readily be seen that this multistage process can lead to discrepancies rendering positive identification extremely difficult.

Other identification kits utilise a base sheet printed with the outline shape of a human face, on to which overlay elements carrying face detail may be positioned, for example as shown in GB-A No. 1278192 or U.S. Pat. No. 3,353,281. In such kits, however, there is little sense of realism during the construction process.

The present invention seeks to provide an identification kit that avoids certain of the above disadvantages.

According to the invention an identification kit comprises at least one base sheet printed with the outline shape of a human face, and a plurality of overlay elements each printed with a detail of a human face and designed to be positioned on the base sheet, the print including areas of contrast within the outline but otherwise being generally featureless, said areas of contrast being selected from the forehead, cheekbone, chin, temples, eye sockets, nose edges, and mouth regions of the face shape.

Use of a base shape printed to have aforesaid areas of contrast, but otherwise featureless, greatly enhances the sense of realism experienced during reconstruction. The overlay elements used need not abut one against another and they lead to greater flexibility in reconstruction of the face, and, in the absence of straight bands or lines across the reconstruction, facilitate recognition. It is preferred if highlighted areas are present in the forehead, cheek bone and chin regions of the face shape, while shaded areas are present in the temples, eye sockets, nose edges and mouth regions of the face shape. Accurate positioning of overlay details is thus facilitated.

The sense of realism attainable with the invention is increased even further if, as is preferred, the base sheet is colour printed to represent a selected skin tone within the shape, and at least some of the overlay elements are each colour printed to substantially similar skin tone. Even further enhancement is obtained if base sheets and overlay elements are derived from actual photographs of human faces.

Desirably an identification kit according to the invention will comprise a plurality of different base sheets, each having an associated plurality of overlay elements. The base sheets may differ by any one or more of racial type, sex, age and skin tone. For example, a complete kit may include base sheets for Afro-Asian, Oriental and Caucasian faces, and within each type, sheets for male and female faces of various ages and skin tones. The selection of a wholly appropriate base sheet will materially assist in accurate reconstruction.

The overlay elements in a kit will usually include one or more representations of a human eye, nose, mouth and eyebrow. Additional features such as moustaches and beards may be included, as may also a range of spectacles. Desirably also the overlay elements include face shape delineation elements for each of the upper left quarter, upper right quarter, lower left quarter and lower right quarter of the face. Thus, the shape depicted on the base sheet may be modified, particularly around the temples and the jaw line by suitable selection of and adjustment of these delineation elements. Such elements may include detail of hair and/or detail of an ear, although both hair and ears could be dealt with by way of separate overlay elements if required.

Desirably the kit includes an overlay screen designed to be positioned over a set of overlay elements assembled on a base sheet. A range of overlay screens may be provided, for example one being transparent and the others being of various tints which will change the skin tone of the assembled face when laid thereover. Tinting of the overlay screens may be selective so that it is darker in some areas than in others. The overlay screens may be of a material such that markings may be made on the exposed surface thereof so allowing, for example, scar markings to be added to the representation.

The kit may also include a final overlay sheet which is transparent and has a matt surface finish, so allowing the final assembled representation to be be photographed through the final overlay sheet without the photograph being affected by glare.

While it is apparent that the base sheet and overlay elements may be printed on any suitable paper or plastics material it is preferred that they be printed on clear, thin plastics material, desirably of a thickness not exceeding 0.025 mm and preferably not exceeding 0.0125 mm.

The base sheet may be supported on any appropriate surface for effecting the reconstruction, for example a simple desk top, a specially designed display board or even the platen of an overhead projector or other projector unit.

Most desirably, however, the kit includes a display board magnetised to provide a display surface with an overall magnetic field over an area on which the base sheet is to be accommodated, and each base sheet and overlay element is printed with an ink incorporating a magnetically-attractable material.

In this arrangement, the base sheet is positively attracted to and held in position on the display board, and similarly the overlays are positively attracted to the display board and are thus held securely in position on the base sheet. This not only prevents edges of the overlay elements from curling away from the base sheet so producing shadow effects, but also allows extremely accurate minute adjustments of the overlay elements in order to gain exactly the required appearance. For example, small adjustments of the spacing between the eyes, of the angles of the eyes, or of the angle of the mouth may readily be effected.

Desirably each base sheet, each overlay element and each overlay screen in a set should be given a distinctive reference number. Information may thus readily be passed from one law enforcement agency to another so that identical representations can readily be reconstructed. Where available, of course, video links may transmit the representation of an assembled face to a suitable receiver, so avoiding the need for coding.

In order that the invention may be better understood a particular example of elements from an identification kit will now be described in more detail, by way of example only, with reference to the accompanying drawings, in which.

The identity kit to be described comprises a base sheet and overlay elements all of which are colour printed with ink containing a ferromagnetic material and designed to be assembled on a display board magnetised to provide a display surface with an overall magnetic field thereover. There are many ways in which a display board having this characteristic can be manufactured, one such construction being described in GB-B No. 2032671. The board is not shown in FIG. 1 of the drawings, although that Figure can be taken as a representation of a base sheet laid on and held against the surface of the board; however the board is shown in the cross-sectional view of FIG. 4.

Figure 1:
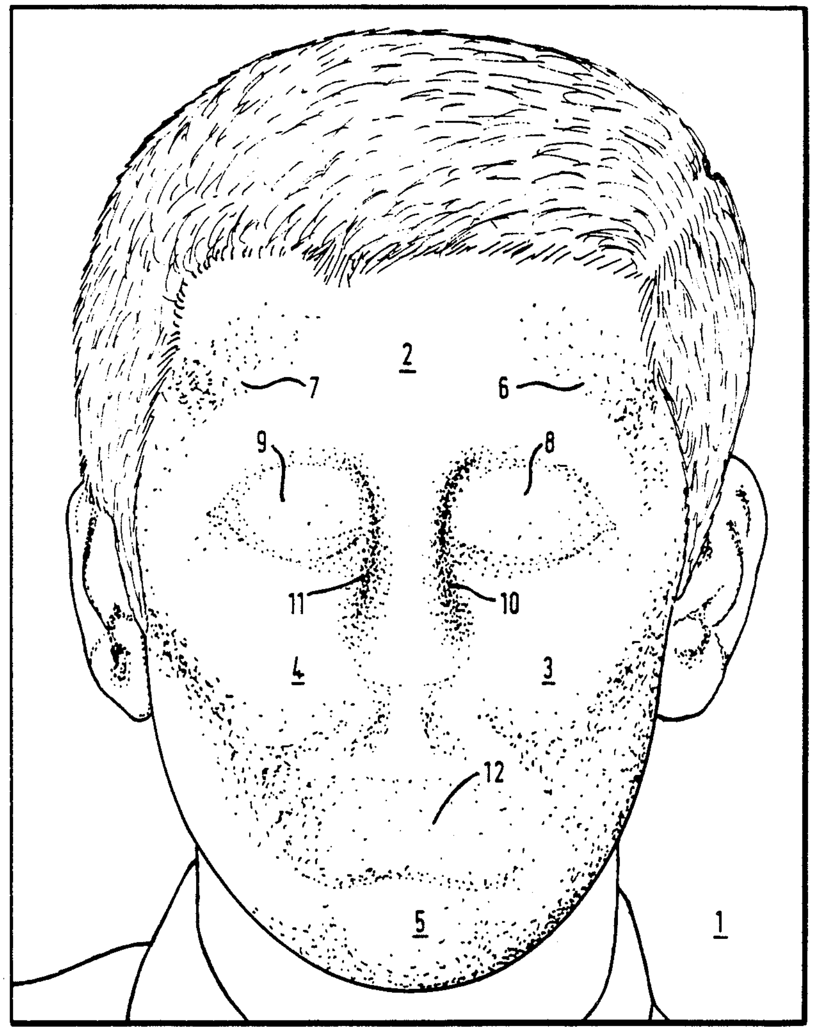
FIG. 1 shows a base sheet.

The base sheet 1 shown in FIG. 1 is printed with the shape of a human face, and in addition to the basic face shape includes ears and a hairline. The face shape is colour printed to represent a selected skin tone within the shape, and within the outline shape the print includes highlighted areas and shaded areas, but is otherwise generally featureless. In the example shown there are highlighted areas in the region of the forehead 2, cheek bones 3, 4 and chin region 5 of the shape. Similarly, there are shaded areas at the temples 6, 7 the eye sockets 8, 9, the edges 10, 11 of the nose and in the region 12 of the mouth.

Figure 2:
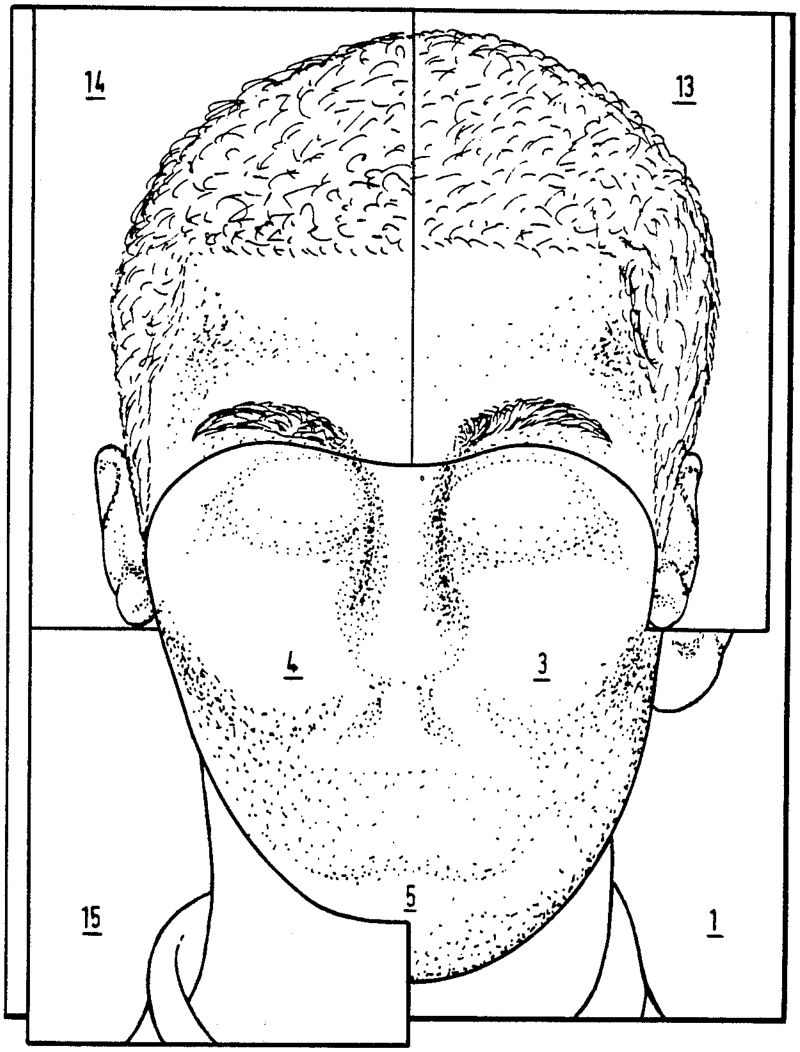
FIGS. 2 and 3 show two stages of constructing a representation of a face on the base sheet.

FIG. 2 shows the beginning of the reconstruction of a face by the positioning of three face shape delineation elements 13 to 15 over the base sheet. The elements 13 and 14 represent respectively the upper left and upper right quarters of the face and they include detail of hair, ears and eyebrows. The element 15 represents the lower right quarter of the face and represents the shape of the jaw line and part of the neck. It will be seen that each of the overlay elements is fully printed so that it obscures the detail of that part of the base sheet over which it is placed. However, much of the highlighted areas and shaded areas of the base sheet remain visible, so that the exposed part of the base sheet remains a recognisable background against which to continue the reconstruction. The particular face shape delineation elements are, of course, chosen from a selection of elements drawn from faces of different shape, hair style and ear and eyebrow detail. The set of elements should all have a similar skin tone to the skin tone used for the base sheet in order to maintain the sense of realism.

Figure 3:
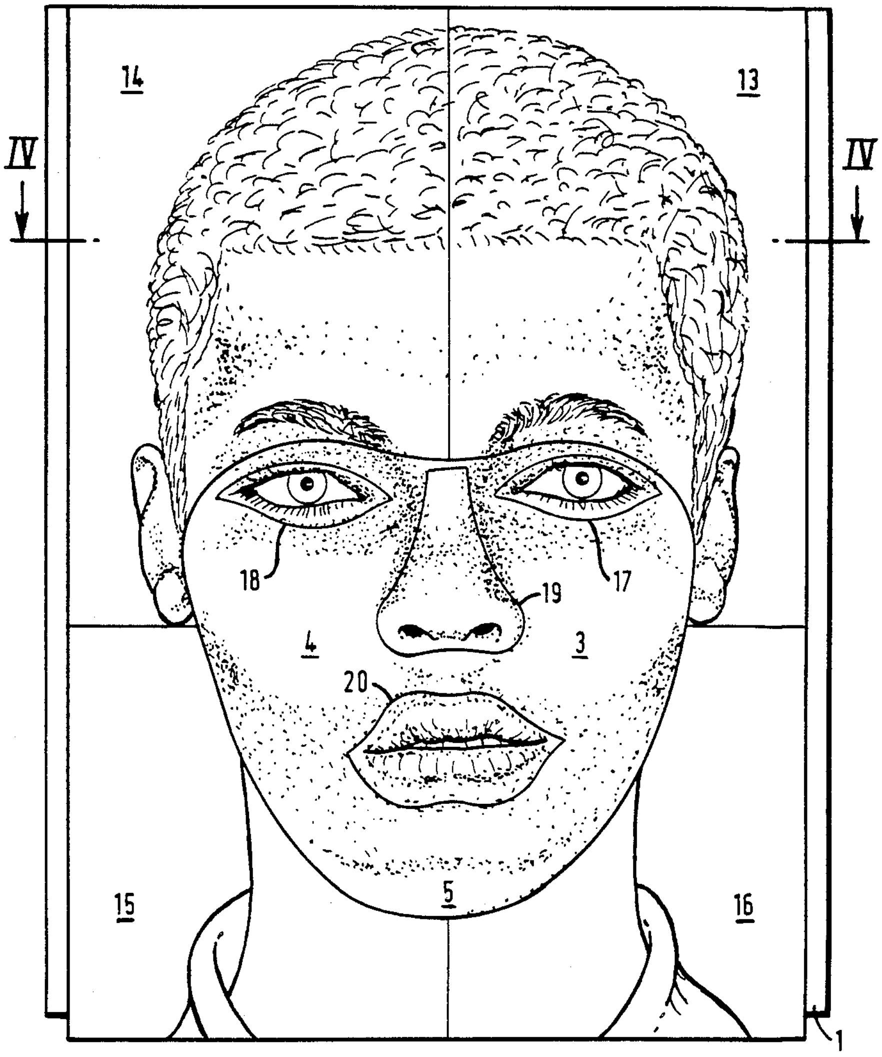

The next stage in the reconstruction will be the addition of the shape delineation element 16 for the lower left-hand part of the face as shown in FIG. 3. By relative adjustment of the elements 15 and 16 it will be seen that small modifications can be made to the jaw line, while other minor changes in shape can be obtained by relative adjustment of others of the four shape delineation elements.

After a satisfactory face shape has been delineated, reconstruction continues by selection and positioning of additional overlay elements representing two eyes 17, 18, a nose 19 and a mouth 20. The pair of eyes, the nose and the mouth that are used are each selected from a plurality of choices according to the recollection of the witness. Positioning of the eyes, nose and mouth can be effected vary accurately in view of the tendency of these elements to be attracted to the board, and such details as the spacing between the eyes, the slant of the eyes and the slant of the mouth can be adjusted to suit exact recollection. Once again, the plurality of elements from which the eyes, nose and mouth are selected are each of skin tone corresponding to the skin tone of the base sheet in order to achieve a realistic effect.

FIG. 3 shows a fully reconstructed face, but it will be appreciated that additional overlay elements may be added thereto, to show, for example, a moustache, a beard or a pair of spectacles, in each case of a suitable selected style. If the ears or the eyebrows that are included in the shape delineation elements appear to be incorrect then these may be masked by ears or eyebrows of selected shape, and again of the same basic skin tone. Indeed, ears and/or eyebrows may be omitted from the face shape delineation elements so that these are in any case selected separately.

Figure 4:
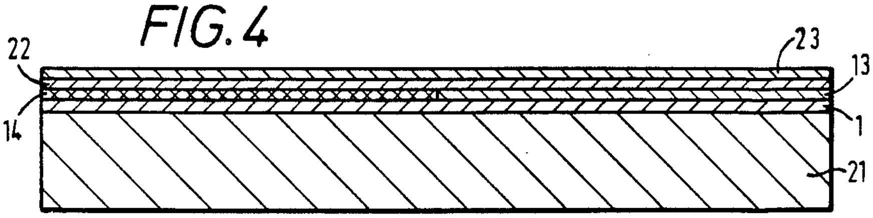
FIG. 4 is a cross-section on line IV—IV through a fully constructed representation on a display board.

FIG. 4 is a schematic cross-sectional view with all parts exaggerated in thickness. It shows the magnetic display board 21, the base sheet 1 laid on the board, and the delineation elements 13 and 14 laid on the base sheet 1. Delineation elements 15, 16 and overlay elements 17 to 20 lie on the sheet 1 in the same plane as the elements 13, 14.

Once this reconstruction has been effected then an overlay sheet 22 is placed over the reconstruction. The overlay sheet may be clear so that the original skin tone of the base sheet is maintained, or the overlay sheet may be selected to have a tint that will create a skin tone nearer to the recollection of the original. The overlay sheet is again desirably magnetically held in position. It should desirably have an exposed surface which can be marked, for example using a felt-tip pen. In this way, additional features such as scars can be added to the face. Once all remaining artwork has been completed a final overlay sheet 23 that is transparent and has amatt surface finish may be positioned over the reconstruction, and the reconstruction photographed through the matt sheet. Thus, glare in the final photograph is avoided and any harsh junctions or borders between the base sheet and the overlaid elements are softened. In this way a very accurate photographic representation of the reconstructed face is obtained.

It is obviously preferred that all the overlay elements from which a selection can be made are colour photographic details of actual human faces. Each base sheet is also preferably derived from an actual photograph of a human face, the negative having been processed by any one or any combination of a number of known techniques in order to remove the feature details while leaving the original skin tone intact and leaving the areas of highlighting and shade in the appropriate regions. It is this use of the basic shaded face shape of the correct skin tone, coupled with overlay elements of matching skin tone which renders the above described identification kit very much simpler for a witness to create a reconstruction from than by use of existing kits.

Although it is preferred to use details from photographs of actual faces and a base sheet prepared from a photograph of an acutal face this is not essential, and it is possible to use artists' impressions of the basic face shape and of the individual features instead. The base sheet may, however, be difficult to create purely from an artist's impression and an alternative to using an actual face is to use a sculpture that omits feature details, and to overlay the necessary tone and texture onto the sculpture to enable an acceptable photograph of a basic face shape to be prepared.

It will be understood that a standard set of base sheets can be formed, the set covering different racial types and within each type different sexes, ages and skin tones. For each base sheet there will be an associated set of overlay elements having the required facial detail, such as eyes, noses and mouths. Each base sheet and each overlay element associated therewith will be coded, so that if two distant law enforcement agencies are each in possession of a kit, transmission of the coded information will enable the remote agency to produce a substantially identical reconstruction.

It will be understood that the materials used for the base sheet and for the overlay elements may be changed from the clear plastic that is preferred and it will be also understood that the set of features that may be selected for the overlay elements may be changed. Other modifications in the assembly, display and transmission of the reconstructed image will also be apparent.

I claim:

1. An identification kit comprising:

at least one base sheet printed with the outline shape of a human face, and color printed to represent a selected skin tone within the outline shape and including areas of contrast within the outline but otherwise being generally featureless, said areas of contrast being selecated from the forehead, cheekbone, chin, temples, eye sockets, nose outline and mouth regions of the face, and a plurality of overlay elements each pictorially illustrating one of a plurality of different facial details selected from pictorial representations of individual human eyes, noses and mouths, and designed to be positioned on the base sheet and to be selectively shiftable with respect thereto and with respect to each other, each of said plurality of overlay elements having a curved outline shape corresponding substantially to the curved outline of the particular facial detail which is pictorially illustrated thereon, whereby the portion of the areas of contrast of the face which is blocked from view by said overlay elements is minimized.

2. An identification kit according to claim 1 in which the areas of contrast include at least one highlighted area selected from the forehead, cheekbone and chin regions of the face shape.

3. An identification kit according to claim 1 in which the areas of contrast include at least one shaded area selected from the temples, eye sockets, nose edges and mouth regions of the face shape.

4. An identification kit according to claim 1 in which a plurality of different base sheets are provided, each having an associated plurality of overlay elements.

5. An identification kit according to claim 4 in which the base sheets differ by at least one of a group of characteristics selected from racial type, sex, age and skin tone.

6. An identification kit according to claim 1 in which the overlay elements include at least one representation of a pair of eyes, a pair of eyebrows, a nose and a mouth.

7. An identification kit according to claim 1 comprising additional overlay elements which face shape delineation elements for each of the upper left quarter, uppeer right quarter, lower left quarter and lower right quarter of the face.

8. An identification kit according to claim 7 in which at least one of the face shape delineation elements includes detail of hair.

9. An identification kit according to claim 7 in which at least one of the face shape delineation elements includes detail of an ear.

10. An identification kit according to claim 1 and including an overlay screen designed to be positioned over a set of overlay elements assembled on a base sheet.

11. An identification kit according to claim 10 in which the overlay screen is tinted.

12. An identification kit according to claim 11 in which the overlay screen is selectively tinted to be darker in some areas than others.

13. An identification kit according to claim 10 in which the material of the overlay screen is such that markings may be made on the exposed surface thereof.

14. An identification kit according to claim 1 and including a final overlay sheet that is transparent and has a matt surface finish.

15. An identification kit according to claim 1 in which the base sheet and each overlay element is printed on clear, thin plastic material.

16. An identification kit according to claim 15 in which the thickness of the plastic material does not exceed 0.025 mm.

17. An identification kit according to claim 1 in which the kit includes a display board magnetised to provide a display surface with an overall magnetic field over an area on which the base sheet is to be accommodated, and each base sheet and overlay element is printed with an ink incorporating a magneticallyattractable material.

18. An identification kit according to claim 1, further comprising at least one additional overlay element which substantially obscures the detail of that portion of said base sheet over which it is placed for altering the outline shape of the part of the human face depicted by said portion of said base sheet.

19. An identification kit according to claim 1 wherein said overlay elements are substantially opaque.

20. An identification kit according to claim 1 wherein said base sheet and overlay elements are derived from actual color photographs of human faces.

21. An identification kit according to claim 1 further comprising means for allowing said overlay elements to releasably adhere to the surface of said base sheet permitting the overlay elements to be readily shifted from one location to another on said base sheet by manual manipulation thereof.

22. An identification kit according to claim 1 wherein the size of each said overlay element corresponds substantially to the size of the particular facial detail which is illustrated thereon.

23. An identification kit according to claim 1 wherein the overall face representation constructed with said overlay elements positioned on said base sheet is substantially devoid of horizontal and vertical lines of demarcation.

* * * * *

UNITED STATES PATENT AND TRADEMARK OFFICE

CERTIFICATE OF CORRECTION

PATENT NO. : 4,676,753

DATED : June 30, 1987

INVENTOR(S) : Robert H. Haggas

It is certified that error appears in the above-identified patent and that said Letters Patent is hereby corrected as shown below:

Column 6, claim 7, line 2, after "which" insert -- include -- ; lines 3 and 4, delete "uppeer" and substitute therefor -- upper -- .

Signed and Sealed this

Twenty-ninth Day of December, 1987

*Attest:*

DONALD J. QUIGG

*Attesting Officer*

*Commissioner of Patents and Trademarks*